(12) United States Patent
Gomez Dias et al.

(10) Patent No.: US 9,338,634 B2
(45) Date of Patent: May 10, 2016

(54) DISCOVERING CAPABILITIES OF OFFLINE USERS

(71) Applicant: Vodafone IP Licensing Limited, Newbury (GB)

(72) Inventors: Alfonso Gomez Dias, Madrid (ES); Juan Miguel Santos Hidalgo, Madrid (ES)

(73) Assignee: Vodafone IP Licensing Limited, Newbury (GB)

( * ) Notice: Subject to any disclaimer, the term of this patent is extended or adjusted under 35 U.S.C. 154(b) by 233 days.

(21) Appl. No.: 13/853,445

(22) Filed: Mar. 29, 2013

(65) Prior Publication Data

US 2013/0258947 A1    Oct. 3, 2013

(30) Foreign Application Priority Data

Mar. 30, 2012    (ES) .................................. 201230494

(51) Int. Cl.
*H04W 8/00*    (2009.01)
*H04L 29/06*    (2006.01)
*H04L 29/08*    (2006.01)

(52) U.S. Cl.
CPC .......... *H04W 8/005* (2013.01); *H04L 65/1006* (2013.01); *H04L 65/1016* (2013.01); *H04L 65/1063* (2013.01); *H04L 65/1073* (2013.01); *H04L 67/303* (2013.01); *H04L 69/24* (2013.01)

(58) Field of Classification Search
USPC .......................................... 370/328, 352–356
See application file for complete search history.

(56) References Cited

U.S. PATENT DOCUMENTS

| | | | | |
|---|---|---|---|---|
| 8,285,852 B2 * | 10/2012 | Angstrom et al. | ............ | 709/227 |
| 2008/0212569 A1 * | 9/2008 | Terrill et al. | .................. | 370/352 |
| 2008/0317010 A1 | 12/2008 | Naqvi et al. | | |
| 2010/0093346 A1 * | 4/2010 | Song et al. | ................. | 455/435.1 |

* cited by examiner

*Primary Examiner* — Thai Nguyen
(74) *Attorney, Agent, or Firm* — Knobbe, Martens, Olson & Bear LLP

(57) ABSTRACT

A system and method is provided for discovering capabilities of a first device communicating with a second device using a telecommunications network. The first and second devices are registered at a service platform. The first and second devices access the service platform through first and second core networks. At the first core network, a request is received from the second device for discovering capabilities of the first device. The first core network determines a first status indicator of the first device. The request is routed from the second device to an application server. The first status indicator of the first device is identified by the application server and a second status indicator of the first device is determined. A response is sent from the application server to the second device, the response containing feature tags describing a set of services supported by the first device.

12 Claims, 6 Drawing Sheets

DISCOVERING CAPABILITIES OF OFFLINE USERS

TECHNICAL FIELD

This application is directed to the field of telecommunication systems and, particularly, to a method and network entity for discovering capabilities of offline users.

BACKGROUND OF THE INVENTION

Rich Communications Suite enhanced (RCS-e) is a GSMA specification that enables different types of communication services prioritising the interoperability of the services across network operators and handset manufacturers. These services or features can be summarised as: Presence (user available, unavailable, on a call . . . ), Instant Messaging, Video Share and File Transfer. All based on IMS using SIP protocol.

In the specification of RCS-e there are two mechanisms to discover whether another user is also a subscriber of the service, and also his/her capabilities (which features are available to share with them):

1) Presence Server mechanism: when a new contact is added to the address book (resource list) an anonymous SUBSCRIBE message is sent to the new user. This SUBSCRIBE message reaches a Presence Server in the other user's network, and based on this user presence rules (if he allows this type of method) the Presence Server replies to this SUBSCRIBE message with a NOTIFY message informing of the RCS capabilities of the user to the originator of the SUBSCRIBE message.

The problem with this first approach is that presence is an expensive service due to hardware, licenses and network infrastructure.

2) Peer to peer mechanism: the user can send an OPTIONS message with its capabilities to an address-book contact to query its capabilities in real time. When the OPTIONS arrives at the other user it will reply with a 2000 K message containing its capabilities. This way, user A is able to know if user B can support a video session (and vice versa) and therefore start it or not.

This second first approach is based on the SIP OPTIONS message, a peer-to-peer message exchanged between clients.

This mechanism is based in the use of tags (each tag is a string that represents a service) contained and transported in the Accept-contact and Contact headers for the SIP OPTIONS, and its responses are:

The tags corresponding to the set of functionalities supported by the requesting terminal at the time this request is made are carried in both the Contact and Accept-contact headers of the SIP OPTIONS message.

The tags corresponding to the subset of functionalities that are supported by the receiving terminal are included in the Contact header of the 200 OK response.

This SIP OPTIONS message is sent in the following scenarios to discover whether a contact is capable of sharing some services:

The first time the service is enabled on the device of user A (note that one SIP OPTIONS message is sent per IMS identity stored in the address book of that user A device);
when a new contact is added to the phone address book; or whenever user A interacts with that contact.

Whenever a SIP OPTIONS message is sent from user A to user B, user A receives one of two types of response:

1) If user B is registered, then the response from user B's client comprises the CAPABILITY STATUS—the set of services currently available for user B, which are added as feature tags in the OPTIONS message.

The situation of case 1) is shown in FIG. 1:

User A and user B have the capabilities for registering at IMS via respective access networks 21, 11. Both IMS networks are interconnected 101.

User A's client 20 sends a SIP OPTIONS message to user B's client 10 to discover user B's capabilities (step 1001). This message is sent via an IMS network 200 of the mobile network operator MNO of user A.

This message reaches an I-CSCF 110 of an IMS network 100 of the mobile network operator MNO of user B. The I-CSCF 110 sends a DIAMETER Location-Info-Request message via the Cx interface to the corresponding HSS 130 (step 1002).

The HSS 130 responds with a Location-Info-Answer message to the I-CSCF 110 with the information of the S-CSCF 120 where user B is located (step 1003).

The I-CSCF 110 forwards the SIP OPTIONS message to the S-CSCF 120 (step 1004*a*), which sends the message to user B's client 10 (step 1004*b*).

User B's client 10 responds to this SIP OPTIONS message with a 200 OK message which includes the service tags corresponding to the subset of the functionalities that are supported by user B, which message reaches user A's client 20 (steps 1005*a*, 1005*b*, 1005*c*).

2) If user B is currently not registered (for instance, user B's phone is off), then the network responds with the following message error: 480 TEMPORARILY UNAVAILABLE (graceful deregistration took place).

Or if the end point of user B is registered but not reachable (e.g. sudden switch off of user B's device due to low battery or coverage drops) the OPTIONS message does not reach user B's terminal, and therefore there is no response. The OPTIONS request will timeout in a core node, implying a 408 REQUEST TIMEOUT message towards user A's device.

This case is shown in FIG. 2:

User A's client 20 sends a SIP OPTIONS message to user B's client 10 to discover the capabilities of user B (step 1006).

This message reaches the I-CSCF 110, which sends a Location-Info-Request message via the Cx interface to the corresponding HSS 130 (step 1007).

The HSS 130 responds with a Location-Info-Answer message to the I-CSCF 110 with the information of the S-CSCF 120 where user B is located (step 1008).

The I-CSCF 110 forwards the SIP OPTIONS message to the S-CSCF 120 (step 1009).

But since user B is either not registered or not reachable, user A's client 20 receives an error message, either a 480 TEMPORARILY UNAVAILABLE or a 408 REQUEST TIMEOUT (step 1010).

Note that from a user experience perspective the two situations described under 2) above are inconclusive, and since there are no service tags in the response no RCS-e services will be shown to user A as available to communicate with user B.

Two problems arise here:

User A will not be aware that user B has the same services that he/she has. Then user A will not try to communicate with user B. User A will need to start a new service discovery process when user B is registered to discover its services, but A is unable to know when to start this process again.

Also note that there are a set of "offline services". These are services that do not require user B to be online to be executed. An example of these services is the chat service when the feature Store and Forward is available (when user B is not reachable, messages are stored by the network and then sent to user B once it REGISTERS again in the IMS network). Then there is no need to wait for user B to be registered to show the service availability.

Thus, the existing solution for discovering capabilities poses a technical problem, since user A is unable to understand the subset of services that this user A is available to access and/or communicate with his/her contacts at certain point in time.

SUMMARY OF THE INVENTION

According to the system described herein, a method of discovering capabilities of a first user or receiver by a second user or requester, whenever such first user is offline, includes providing an application server on the signalling path towards the receiver. This application server replies on behalf of the first user, modifying the response adding the desired service tags to the response that is sent as reply towards the second user. Therefore, the second user (requester) is informed of the desired capabilities that the mobile network operator of the first user wants to populate when such first user is either not registered or not reachable.

According further to the system described herein, a method is provided for discovering capabilities of a first device operable to communicate with a second device using a telecommunications network, the first and second devices being registered at a service platform—e.g. IMS—of this network, the first device being capable of accessing the service platform through a first core network and the second device being capable of accessing the service platform through a second core network.

The method comprises the steps of:
receiving at the first core network a request from the second device for discovering capabilities of the first device;
determining by the first core network a first status indicator of the first device.

According further to the system described herein, the method further comprises the steps of:
routing the request from the second device to an application server of the service platform;
identifying the first status indicator of the first device by the application server and determining a second status indicator of the first device;
sending a response from the application server to the second device, the response containing a set of feature tags defined by a network operator of the first device which describe a set of services supported by the first device.

The first status indicator may be selected from unregistered status or registered status. The second status indicator may be selected from unregistered status or unreachable status.

The first core network and the second core network can belong to the same mobile network operator or they can belong to different mobile network operators.

The step of routing the request from the second device to the application server may comprise sending the request to a certain communication port of the application server, which communication port depends on the determined first status indicator.

The set of feature tags may depend on the determined second status indicator.

The step of determining a first status indicator of the first device by the core network may include assigning an S-CSCF for the first device, that S-CSCF receiving an unregistered status indicator of the first device from an HSS of the first core network.

The step of determining a first status indicator of the first device by the core network may include receiving a registered status indicator of the first device from an HSS of the first core network and an S-CSCF where the first device is assigned.

The step of identifying the first status indicator of the first device by the application server may comprise reading a route header of the request received at the application server, the route header including the first status indicator. Or it may comprise identifying at which communication port the request has been received at the application server.

If the identified first status indicator of the first device is unregistered status, the second status indicator is determined to be unregistered status and the response from the application server to the first device is sent upon reception of the request.

If the identified first status indicator of the first device is registered status and a timer triggered by the application server has expired, the first device is not reachable, the second status indicator is determined to be unreachable status and the response from the application server to the second device is sent after said timer has expired.

This timer may also be triggered by another node of the first core network, in which case the second status indicator is also determined to be unreachable status when an error message—an error response to the request—is received at the application server, the response from the application server (300) to the second device being sent upon reception of said error message. According further to the system described herein, a network entity is provided in a core network of a first device, which first device is operable to communicate with a second device using a telecommunications network.

The network entity is configured to, upon receipt of a request from the second device for discovering capabilities of the first device:
identifying a first status indicator of the first device;
determining a second status indicator of the first device;
sending a response to the second device, the response including a set of feature tags defined by a network operator of the first device which describe a set of services supported by the first device.

The network entity may be an IMS application server.

The step of identifying the first status indicator of the first device by the entity network may comprise reading a route header of the request received, the route header including the first status indicator.

Another possible way of identifying the first status indicator—which may substitute or complement the previous way—of the first device by the network entity comprises identifying at which communication port the request has been received.

BRIEF DESCRIPTION OF THE DRAWINGS

Embodiments of the system described herein are explained in detail below on the basis of the figures, which are briefly described as follows.

DETAILED DESCRIPTION OF VARIOUS EMBODIMENTS

The following abbreviations are used throughout the present description:
GSMA GSM Association
HSS Home Subscriber Server
IMS IP Multimedia Subsytem
I-CSCF Interrogating Call Session Control Function
MNO Mobile Network Operator
NNI Network-to-Network Interface
S-CSCF Serving Call Session Control Function As it will be apparent with the description of FIGS. 3, 4 and 5 below, the method of the system described herein is based on including an application server 300 in the signalling path towards the receiver user B, both when the user B is not registered or not reachable.

This application server 300 acts as an enabler and is built on top of the RCS-e IMS network.

Figure 1:
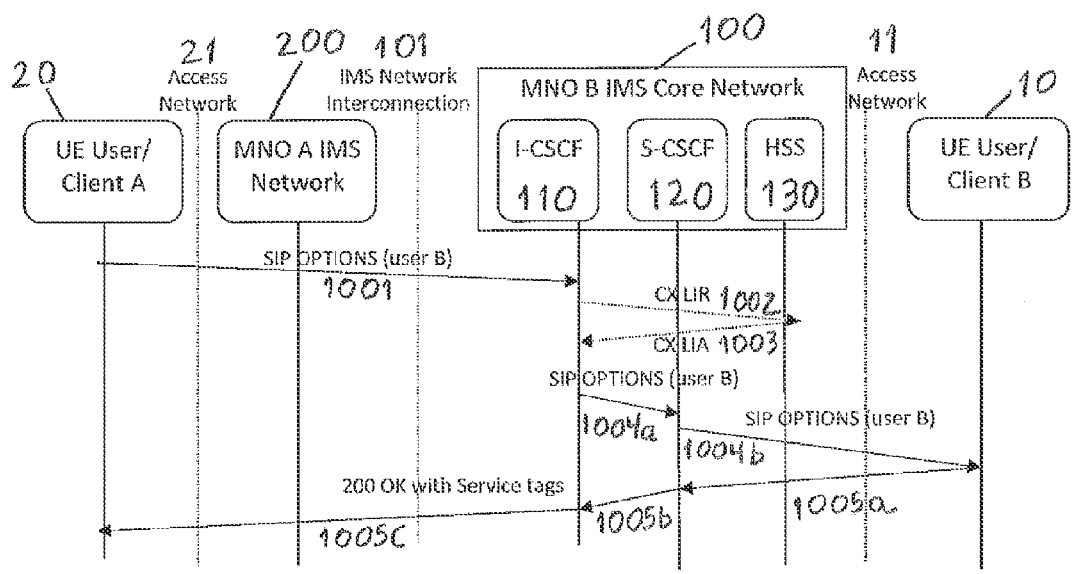
FIG. 1 shows the process of discovering capabilities of another user via the SIP OPTIONS message, in the case of a successful request in accordance with an embodiment of the system described herein.
Figure 2:
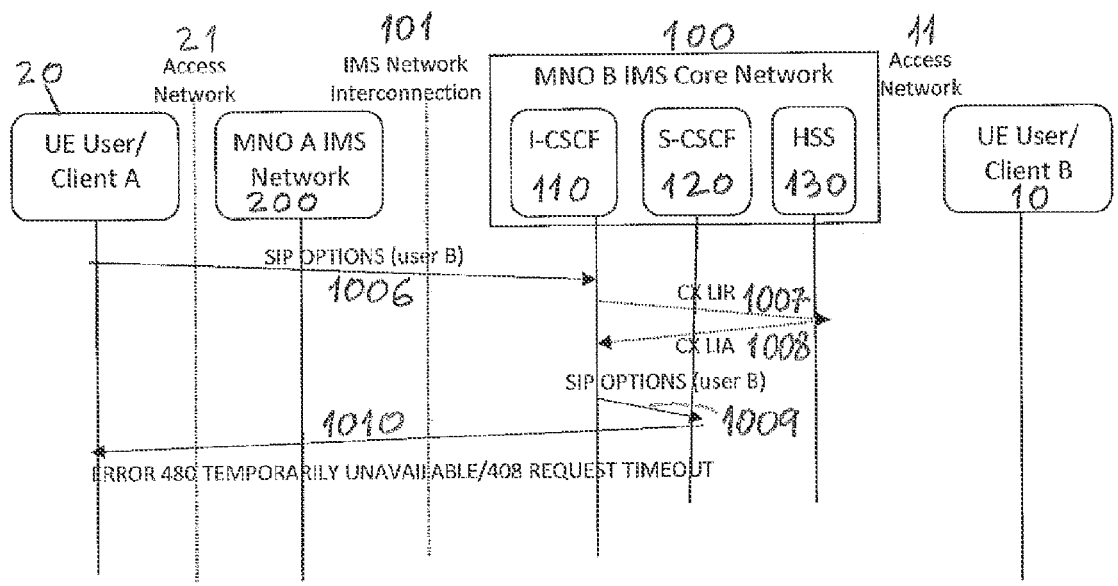
FIG. 2 shows the process of discovering capabilities of another user via the SIP OPTIONS message, but in the case the request is not successful in accordance with an embodiment of the system described herein.
Figure 3:
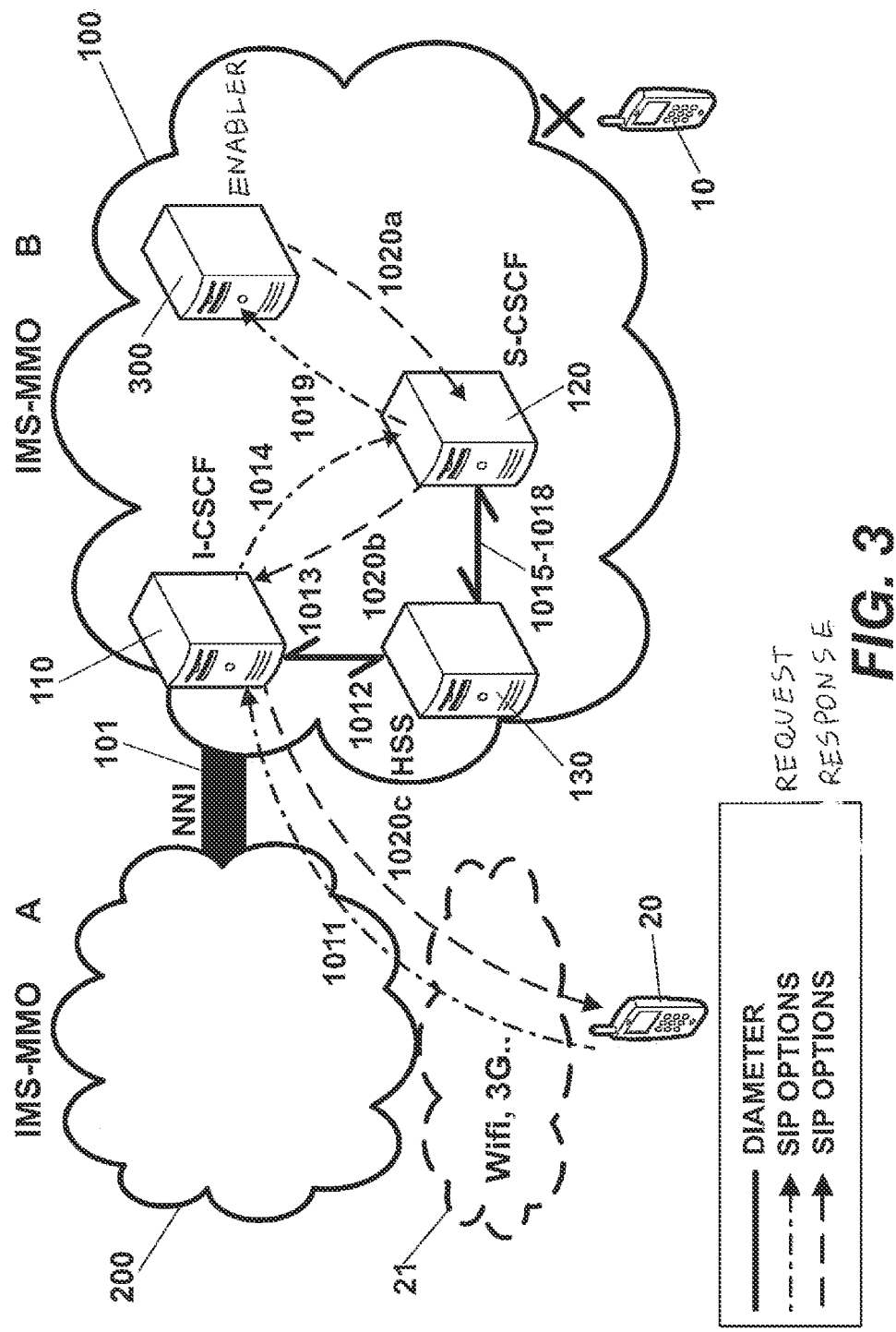
FIG. 3 shows a system view of the process of discovering capabilities of a user who is not registered according to an embodiment of the system described herein.
Figure 4:
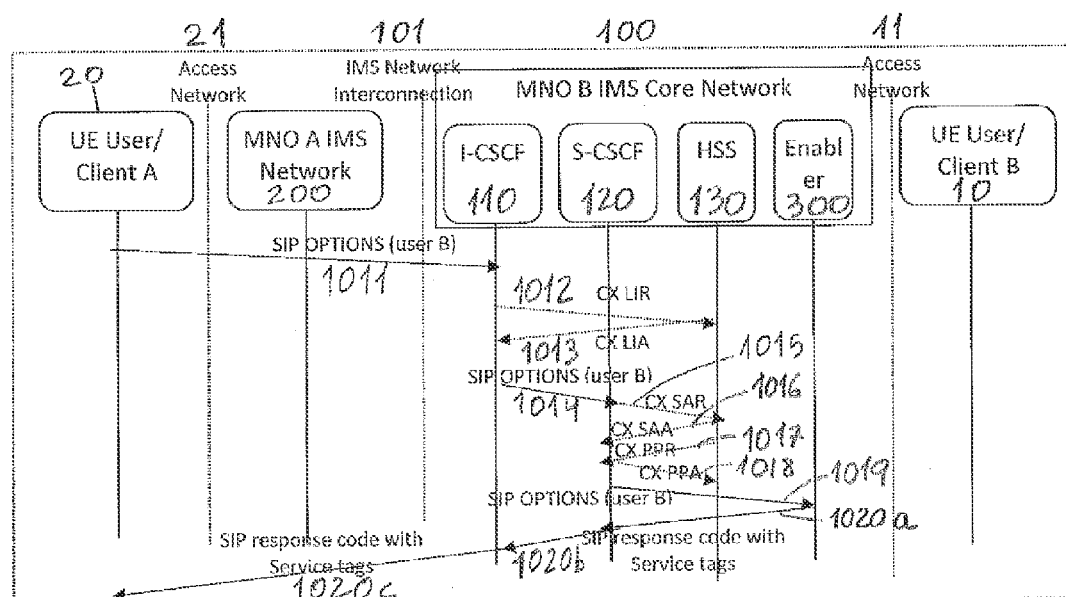
FIG. 4 shows the process of discovering capabilities of a user who is not registered according to an embodiment of the system described herein.
Figure 5:
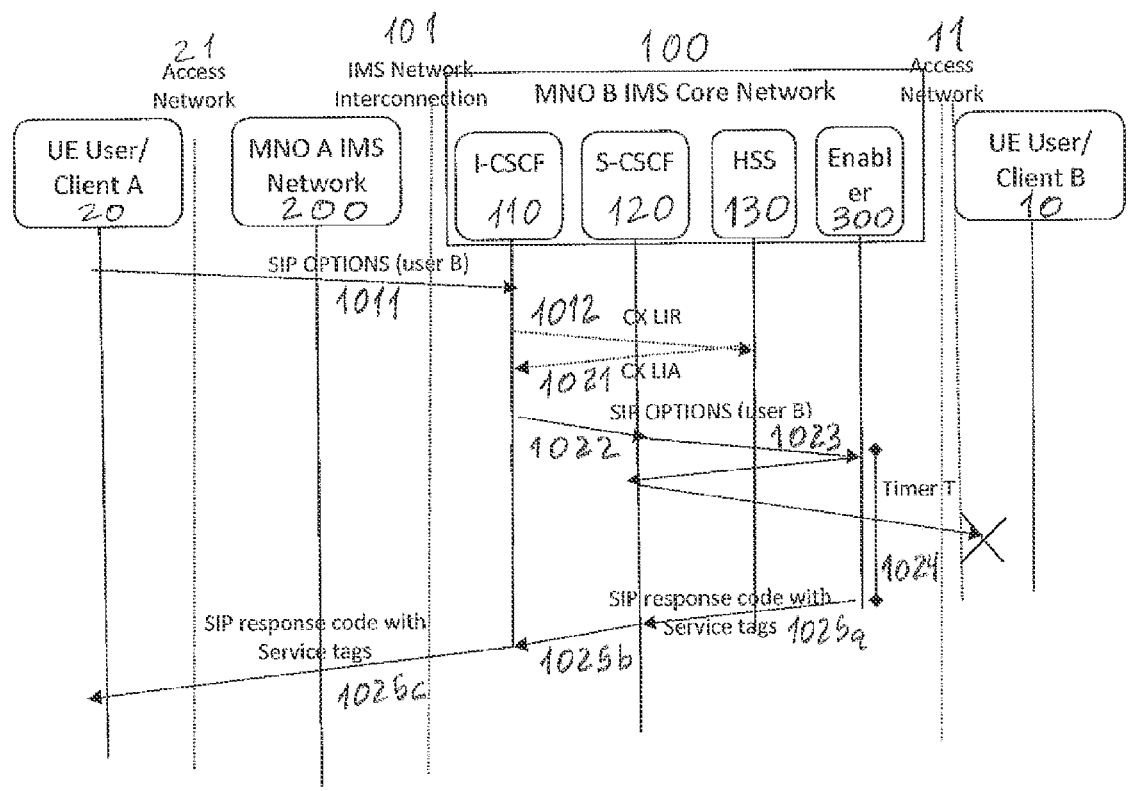
FIG. 5 shows the process of discovering capabilities of a user who is not reachable according to an embodiment of the system described herein.

Similarly to the case shown in FIG. 1 above, FIGS. 3-5 show the case where user A wants to discover the capabilities of a user B:

User A and user B both have the capability of registering at IMS via respective access networks 21, 11. Both IMS networks are interconnected 101.

User A's client 20 sends a SIP OPTIONS message to user B's client 10 to discover the capabilities of user B (step 1011). Regardless of the access network (WiFi, 3G, . . . ) this message is sent to the IMS network 100 of mobile network operator MNO of user B via the IMS network 200 of the mobile network operator MNO of user A. Both networks are connected via an NNI interconnection 101, as described in the standards.

Specifically, this SIP OPTIONS message reaches an I-CSCF 110 in the IMS network 100 of user B. The I-CSCF 110 sends a Location-Info-Request message to the corresponding HSS 130 to know in which S-CSCF user B is assigned (step 1012).

At this point, in the case shown in FIGS. 3 and 4 where user B is not registered:

The HSS 130 responds with a Location-Info-Answer message to the I-CSCF 110 with the information that there is no S-CSCF assigned and including a set of user profile service capabilities for user B (step 1013).

In this case this service profile includes at least a condition indicating that the SIP OPTIONS message has to reach the application server 300 at a certain IP:port when the user is unregistered.

Based on this condition further operations apply instead of getting a 480 Calling User Not Registered response.

By setting this condition in the service profile of user B it is possible to continue processing the SIP OPTIONS message even when the user is not available. Indeed:

Based on this service profile, a suitable S-CSCF is selected by the I-CSCF and this S-CSCF updates the HSS with a DIAMETER Service-Assignment-Request message (step 1015).

This way user B is assigned to that S-CSCF 120 and the HSS 130 replies with a DIAMETER Service Assignment Answer (step 1016).

The HSS 130 then sends a Push-Profile-Request with the information about the user status (unregistered) and the service profile of the user (step 1017). This service profile of user B contains a sequence of orders, including the next hop for every message based on the status of the user. Once this is stored in the S-CSCF, it replies with a Push-Profile-Answer (step 1018).

Among these service profile conditions there is a trigger for every OPTIONS message received when user B is in the unregistered status. The condition is to route the OPTIONS message towards the application server 300 (step 1019), which in fact is a service enabler. The application server 300 identifies the case (user unregistered) thanks to a session-case added by the S-CSCF into the route header or due to the destination IP:port.

Then the application server 300 builds a static response for every OPTIONS message received under the unregistered status adding a SIP Contact header including the feature tags defined by the mobile network operator of user B in the configuration of the application server (step 1020a, 1020b). Every feature tag represents a different service and is added as a Contact header parameter according to RFC3261. For instance:

Contact: "Mr. Watson" <sip:watson@worcester.bell-telephone.com>; feature-tag-service1;feature-tag-service2;featuretag-service3

This response code reaches the client of user A (step 1020c), that identifies the service feature tags.

In the case shown in FIG. 5, user B is not reachable. In this case the behaviour is similar, but after step 1012:

The HSS 130 responds with a DIAMETER Location-Info-Answer message with the S-CSCF 120 where user B is already assigned (step 1021).

Therefore, the SIP OPTIONS request is sent towards that S-CSCF 130 (step 1022).

In this S-CSCF the service profile triggers for user B are already stored. And the service profile includes, besides the condition indicated for the unregistered case, a condition to reach the application server 300 at a certain IP:port when the user is registered. This IP:port is different from the IP:port of the previous case so as to distinguish both cases.

Based on this condition further operations apply instead of getting a 408 Request Time Out response.

By setting this condition in the service profile of user B it is possible to continue with the SIP OPTIONS message, by including the application server (the enabler) in the signalling loop, so that it can monitor the responses.

Therefore the OPTIONS message is routed to the application server (step 1023).

The application server 300 identifies the case (user registered) thanks to the session-case added by the S-CSCF into the route header or thanks to the destination IP:port.

In the case shown in FIG. 5, the application server 300 triggers a timer T (step 1024). If this timer expires and there has been no successful response to the OPTIONS message, it means that user B is not reachable and the application server builds a static response for that OPTIONS message.

Figure 6:
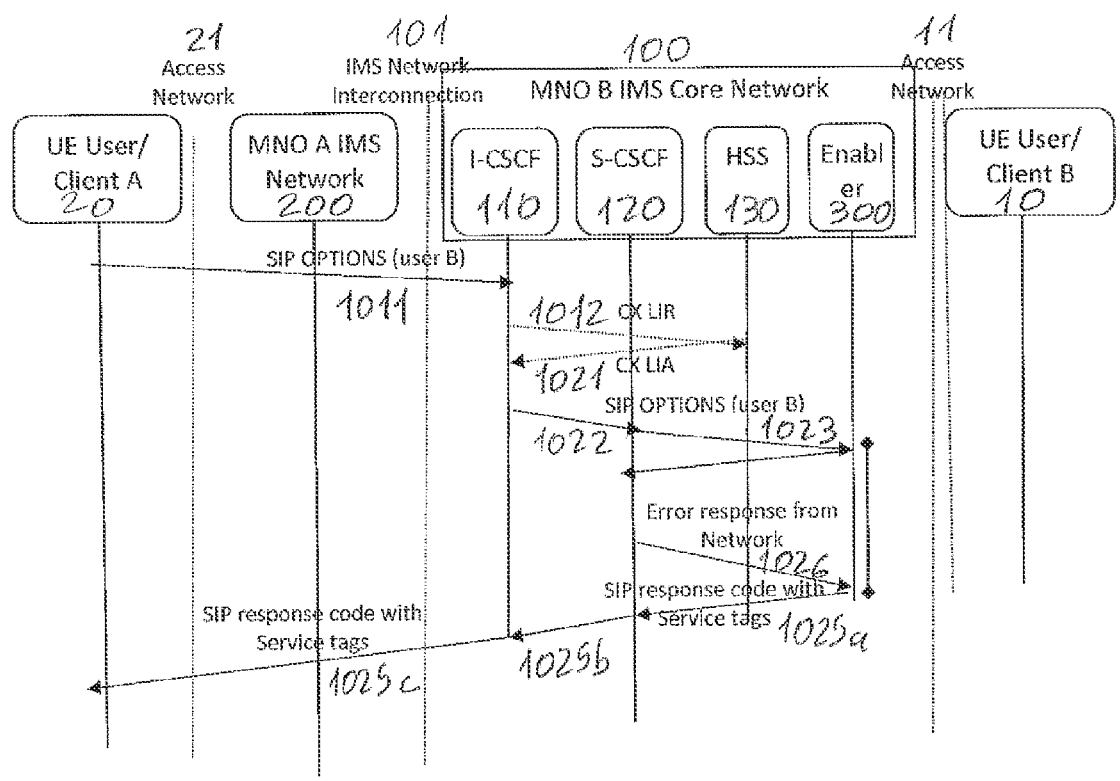
FIG. 6 shows another possible process of discovering capabilities of a user who is not reachable according to an embodiment of the system described herein.

Another possibility of learning that user B is offline or not reachable is shown in FIG. 6, where the application server 300 also builds a static response for that OPTIONS message including the corresponding not reachable service tags which reaches user A (steps 1025a, 1025b, 1025c) if an error response is received at the application server from user B's network (network error, network timeout) (step 1026).

So if user B is not reachable (as shown in FIG. 5-6), the static response includes a SIP Contact header including the feature tags defined by the mobile network operator of user B in the configuration of the application server (step 1025*a*, 1025*b*). Every feature tag represents a different service and is added as a Contact header parameter according to RFC3261. For instance:

---
Contact: "Mr. Watson" <sip:watson@worcester.bell-telephone.com>;
feature-tag-service1;feature-tag-service2;featuretag-service3

---

This response code reaches the client of user A (step 1025*c*), that identifies the service feature tags.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with other computers and/or with a user. Software implementations of the system described herein may include executable code that is stored in a computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for discovering capabilities of a first device operable to communicate with a second device using a telecommunications network comprising a service platform, a first core network and a second core network, the first and second devices being registered at the service platform, the first device being capable of accessing the service platform through the first core network and the second device being capable of accessing the service platform through the second core network, the method comprising:
    receiving at the first core network a request from the second device for discovering capabilities of the first device;
    determining by the first core network a first status indicator of the first device;
    routing the request to an application server of the service platform;
    identifying the first status indicator of the first device by the application server and determining a second status indicator of the first device, wherein identifying the first status indicator of the first device comprises reading a header of the request, the header including the first status indicator; and
    sending a response from the application server to the second device, the response containing a set of feature tags defined by a network operator of the first device which describe a set of services supported by the first device, wherein, if the identified first status indicator of the first device is unregistered status, the determined second status indicator is unregistered status and the response from the application server is sent to the second device.

2. The method according to claim 1, wherein routing the request to the application server includes sending the request to a certain communication port of the application server, the communication port being in dependence on the determined first status indicator.

3. The method according to claim 2, wherein identifying the first status indicator of the first device by the application server includes identifying at which communication port the request has been received at the application server.

4. The method according to claim 1, wherein the set of feature tags depend on the determined second status indicator.

5. The method according to claim 1, wherein determining the first status indicator of the first device includes assigning a Serving Call Session Control Function (S-CSCF) for the first device, the S-CSCF receiving an unregistered status indicator of the first device from a Home Subscriber Server (HSS) of the first core network.

6. The method according to claim 1, wherein the step of determining the first status indicator of the first device includes receiving a registered status indicator of the first device from a Home Subscriber Server (HSS) of the first core network and a Serving Call Session Control Function (S-CSCF) where the first device is assigned.

7. The method according to claim 1, wherein the first core network and the second core network belong to the same network operator.

8. A network entity in a core network of a first device operable to communicate with a second device using a telecommunications network comprising a service platform, a first core network and a second core network, the first and second devices being registered at the service platform, the first device being capable of accessing the service platform through the first core network and the second device being capable of accessing the service platform through the second core network, the network entity, upon receipt of a request from the second device for discovering capabilities of the first device, being configured to:
    a receiver configured to receive a request from the second device;
    a processor configured to identify a first status indicator of the first device in response to the request;
    determine by a processor a second status indicator of the first device, wherein identifying the first status indicator of the first device comprises reading a header of the request, the header including the first status indicator; and
    a transmitter configured to send a response to the second device, the response including a set of feature tags defined by a network operator of the first device which describe a set of services supported by the first device, wherein, if the identified first status indicator of the first device is unregistered status, the determined second status indicator is unregistered status and the response from the application server is sent to the second device.

9. The network entity according to claim 8, wherein identifying the first status indicator of the first device comprises identifying at which communication port the request has been received.

10. The network entity according to claim 8, wherein the network entity is an IP Multimedia Subsystem (IMS) application server.

11. A method for discovering capabilities of a first device operable to communicate with a second device using a telecommunications network comprising a service platform, a first core network and a second core network, the first and second devices being registered at the service platform, the first device being capable of accessing the service platform through the first core network and the second device being capable of accessing the service platform through the second core network, the method comprising:

receiving at the first core network a request from the second device for discovering capabilities of the first device;

determining by the first core network a first status indicator of the first device;

routing the request to an application server of the service platform;

identifying the first status indicator of the first device by the application server and determining a second status indicator of the first device, wherein identifying the first status indicator of the first device comprises reading a header of the request, the header including the first status indicator; and sending a response from the application server to the second device, the response containing a set of feature tags defined by a network operator of the first device which describe a set of services supported by the first device, wherein, if the identified first status indicator of the first device is registered status, the determined second status indicator is unreachable status if a timer triggered by the application server has expired and the response from the application server to the second device is sent after the timer has expired.

12. A method for discovering capabilities of a first device operable to communicate with a second device using a telecommunications network comprising a service platform, a first core network and a second core network, the first and second devices being registered at the service platform, the first device being capable of accessing the service platform through the first core network and the second device being capable of accessing the service platform through the second core network, the method comprising:

receiving at the first core network a request from the second device for discovering capabilities of the first device;

determining by the first core network a first status indicator of the first device;

routing the request to an application server of the service platform;

identifying the first status indicator of the first device by the application server and determining a second status indicator of the first device, wherein identifying the first status indicator of the first device comprises reading a header of the request, the header including the first status indicator; and sending a response from the application server to the second device, the response containing a set of feature tags defined by a network operator of the first device which describe a set of services supported by the first device, wherein, if the identified first status indicator of the first device is registered status, the determined second status indicator is unreachable status if an error message from the first core network is received at the application server, and the response from the application server to the second device is sent upon reception of said error response/message.

* * * * *